United States Patent
Hayashi et al.

(10) Patent No.: US 8,457,530 B2
(45) Date of Patent: Jun. 4, 2013

(54) PLASTIC OPTICAL ELEMENT, OPTICAL SCANNING DEVICE, AND IMAGE FORMING APPARATUS

(75) Inventors: Eiichi Hayashi, Atsugi (JP); Takamichi Ohhashi, Yokohama (JP); Go Takahashi, Kawasaki (JP); Kan Aoki, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 311 days.

(21) Appl. No.: 12/872,334

(22) Filed: Aug. 31, 2010

(65) Prior Publication Data

US 2011/0058853 A1    Mar. 10, 2011

(30) Foreign Application Priority Data

Sep. 8, 2009  (JP) .................................. 2009-206684

(51) Int. Cl.
*G03G 15/04* (2006.01)
*G02B 26/08* (2006.01)
*G02B 26/10* (2006.01)
*G02B 26/12* (2006.01)
*G02B 7/02* (2006.01)

(52) U.S. Cl.
USPC .................. 399/218; 359/205.1; 359/811

(58) Field of Classification Search
CPC ................................................ G03G 15/0409
USPC ................ 399/218; 359/205.1, 811
See application file for complete search history.

(56) References Cited

U.S. PATENT DOCUMENTS

| | | | | |
|---|---|---|---|---|
| 2007/0119935 A1* | 5/2007 | Shimomura | .................. | 235/454 |
| 2007/0216983 A1* | 9/2007 | Hayashi et al. | ............... | 359/201 |
| 2008/0159785 A1* | 7/2008 | Nagase | ......................... | 399/218 |

FOREIGN PATENT DOCUMENTS

| | | |
|---|---|---|
| CN | 2048982 U | 12/1989 |
| CN | 1825162 A | 8/2006 |
| CN | 1847917 A | 10/2006 |
| JP | 4-127115 | 4/1992 |
| JP | 10-148777 | 6/1998 |
| JP | 2002-337178 | 11/2002 |

OTHER PUBLICATIONS

Chinese official action dated Aug. 31, 2012 in corresponding Chinese patent application No. 201010277920.X.

* cited by examiner

*Primary Examiner* — David Gray
*Assistant Examiner* — Tyler Hardman
(74) *Attorney, Agent, or Firm* — Cooper & Dunham LLP

(57) ABSTRACT

A plastic optical element for use in an optical scanning device including light effective portions that focus light, and at least one link portion that connects the light effective portions in the sub-scanning direction, the link portion forming a border arc having a curvature radius R of 2 mm or greater and contacting the light effective portions such that the tangent of the light effective portion at the connection point of the light effective portion and the border arc matches the tangent of the border arc at the connection point.

3 Claims, 10 Drawing Sheets

R < 2 mm

R ≧ 2 mm

MIRROR SURFACE: CONCAVE
→ IMPOSSIBLE TO PROCESS

MIRROR SURFACE: CONVEX
→ FORM AT BORDER DETERIORATES

MIRROR SURFACE: CONCAVE

MIRROR SURFACE: CONVEX

VARIABILITY OF FORM ACCURACY IN
NON-CONTINUOUS MIRROR-LIKE FINISHING

VARIABILITY OF FORM ACCURACY IN
CONTINUOUS MIRROR-LIKE FINISHING

1 > b/a

1 < b/a

PLASTIC OPTICAL ELEMENT, OPTICAL SCANNING DEVICE, AND IMAGE FORMING APPARATUS

BACKGROUND OF THE INVENTION

1. Field of the Invention

The present invention relates to a plastic optical element, an optical scanning device employing the plastic optical element, and an image forming apparatus employing the optical scanning device.

2. Discussion of the Background

There are optical scanning devices for use in multi-color image forming apparatuses that form images on image bearing members according to image information. Such optical scanning devices guide each of multiple laser beams of light emitted from multiple laser light sources onto the image bearing member via deflectors and image formation devices.

Digital photocopiers or laser printers which form color images by simultaneously irradiating four photoreceptor drums arranged in the transfer direction of output sheets with beams of light corresponding to respective photoreceptor drums to form latent images thereon, developing the latent images with different colors of yellow, magenta, cyan, and black with development devices, and overlapping the developed images while sequentially transferring them to the output sheets, have been introduced in recent years into the market to satisfy demand for multi-color image forming apparatuses that produce quality images at a high speed.

In such image forming apparatuses, multiple scanning devices are used for optical scanning, which requires a large space for arrangement of the multiple scanning devices, resulting in a size increase of the image forming apparatus. To deal with this issue, for example, unexamined published Japanese patent application publication no. (hereinafter referred to as JP-A) H04-127115-A describes an arrangement in which multiple beams of light pass through image formation lenses arranged in a stack, i.e., laminate manner, via a single deflector before scanning.

Furthermore, JP-H10-148777-A describes an approach in which image formation devices are provided for each beam of light entering into a single deflector and focus images on corresponding image bearing members while scanning. The image formation device has an integrated structure of multiple optical elements laminated along the sub-scanning direction, i.e., latitudinal direction. Due to this laminated structure, the space required for the intervals between deflectors can be reduced, or the structure itself can be constituted as a single deflector. This lessens the burden on a motor that rotates the deflectors and makes size reduction possible.

With regard to the image formation elements, i.e., optical elements, installed, their cost is reduced by changing the material from glass to plastic and by mass production. In addition, the number of functional elements (parts) is also reduced due to introduction of non-spherical forms, such as longitudinally asymmetrical forms.

With regard to the optical scanning device having a single deflector and image formation elements arranged facing the deflector and laminated in the latitudinal direction, any lapse in quality among the image formation devices shows up as a variability, i.e., a relative positional shift, between individual colors of yellow, magenta, cyan and black.

To be specific, an error in the dimensional accuracy of the image formation elements, i.e., variability in the curvature error component, and variability in a high frequency error component obtained after subtracting the curvature error component at each image height, results in variability (relative positional shift) in optical performance of individual colors such as beam spot diameter, and scanning position.

Variability, i.e., relative positional shift, of the scanning position in the sub-scanning direction, accompanied by variability of the high frequency error component at each image height in the sub-scanning direction among each image formation element, is a fatal problem for a color image forming apparatus.

In this connection it is to be noted that when the image formation element is made of plastic, the dimensional accuracy of the lens phase depends on (1) processing accuracy of mirror-finish inserts, and (2) molding processing.

At the same time, when a typical mirror-finish insert is used, inaccuracy in mounting caused by laminating the image formation elements leads to variability in the scanning position, i.e., relative positional shift, along the sub-scanning direction, resulting in the fatal problem of color shift described above.

The adverse impact on dimensional accuracy and optical performance such as beam spot diameter, and scanning position relating to fixing accuracy is particularly pronounced with continued improvement in the quality of images produced by current image forming apparatus.

SUMMARY OF THE INVENTION

Because of these reasons, the present inventors recognize that a need exists for a highly accurate plastic optical element that has improved optical performance without a cost increase accompanied by changing a processing method or a design of a die of the plastic optical element i.e., scanning lens, an optical scanning device and an image forming apparatus using the plastic optical element.

Accordingly, an object of the present invention is to provide a highly accurate plastic optical element that has improved optical performance without a cost increase accompanied by changing a processing method or a design of a die of the plastic optical element, i.e., scanning lens, an optical scanning device and an image forming apparatus using the plastic optical element.

Briefly this object and other objects of the present invention as hereinafter described will become more readily apparent and can be attained, either individually or in combination thereof, by a plastic optical element for use in an optical scanning device including light effective portions that focus light, and at least one link portion that connects the light effective portions in the sub-scanning direction, the link portion forming a border arc having a curvature radius R of 2 mm or greater and contacting the light effective portions such that the tangent of the light effective portion at a connection point of the light effective portion and the border arc matches the tangent of the border arc at the connection point.

As another aspect of the present invention, an optical scanning device is provided which includes a light source, a deflector that deflects light emitted from the light source, an image formation optical system that focuses the light deflected by the deflector, the image formation optical system including the plastic optical element mentioned above arranged facing the deflector, and a light entering system that enters the light focused by the image formation optical system into a target.

As another aspect of the present invention, an image forming apparatus is provided which includes an image bearing member, the optical scanning device mentioned above that forms a latent electrostatic image on the image bearing member, a development device that develops the latent electrostatic image with toner to form a toner image on the image bearing member, and a transfer device that transfers the toner image to a recording medium.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF EMBODIMENTS

Figure 1:
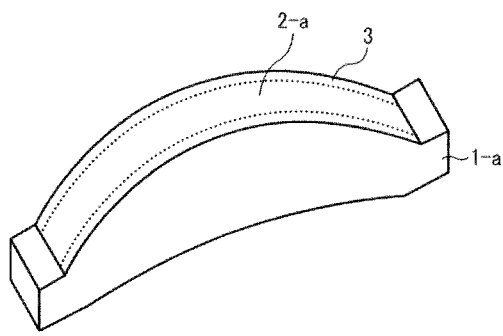
FIG. 1 is a diagram illustrating a perspective view of a typical plastic scanning fθ lens.

The following embodiments of the present disclosure are based on experimental data showing that when the curvature radius is too small, for example, less than 2 mm, the edge tool, i.e., bit, used in the cutting process contacts or interferes with points other than the processing contact point, resulting in the problem of damage to the die, i.e., mirror-finish insert. In addition, it is impossible to change the form of the edge tool to avoid this problem taking into account the physical strength against the processing resistance.

According to the structure of the plastic optical element of the embodiments of the present disclosure for use in an optical scanning device, the plastic optical element including light effective portions that focus light, and at least one link portion that connects the light effective portions in the sub-scanning direction, the link portion forming a border arc having a curvature radius R of 2 mm or greater and contacting the light effective portions such that the tangent of the light effective portion at a connection point of the light effective portion and the border arc matches the tangent of the border arc at the connection point.

To manufacture the structure described above, mirror-like finishing is possible, and in addition continuous mirror-like finishing is also possible in the main scanning direction, or the sub-scanning direction with a mirror-finish insert having a convex surface form. Alternatively, with regard to a mirror-finish insert having a concave surface form for which mirror-like finishing is generally possible, continuous mirror-like finishing is also possible in the main scanning direction, or the sub-scanning direction.

Since the continuous mirror-like finishing is possible in the sub-scanning direction, the error of the dimensional accuracy of each light effective portion, i.e., the variability of the curvature error component and the high frequency error component obtained after subtracting the curvature error at each image height, can be reduced. When a lens is subject to continuous mirror-like finishing treatment in the sub-scanning direction, one of the main impacts (history), i.e., changes in the environment such as atmospheric temperature, during mirror-like finishing, is almost equal at each image height. Therefore, the variability of the high frequency error component at each image height and in the sub-scanning direction among the light effective portions can be reduced.

As a result, the variability of the scanning position, i.e., relative positional shift, in the sub-scanning direction decreases, resulting in reduction of occurrence of color shift, one of the major impacts for a color image forming apparatus.

Additionally, when a mirror-finish insert having a concave surface form is used for the structure of the embodiments, the figure i.e., plane dimensional accuracy, around the border, i.e., folding point, in the sub-scanning direction is improved, thereby improving the accuracy of the image formation element, i.e., plastic optical element.

At the same time, when the mirror-finish insert is used, the variability of the fixing accuracy is reduced because the image formation elements are laminated. As a result, the variability of the scanning position, i.e., relative positional shift, in the sub-scanning direction decreases, which leads to improvement in color shift, one of the major impacts for a color image forming apparatus.

In addition, integration of the scanning lenses has merits of: (A) reducing trouble with regard to appearance at the border surface due to air engulfment, etc. occurring when two or more mirror-finish inserts are attached; (B) saving the cost by shortening the cycle time of cooling time, etc.

An optical scanning device is also provided which includes a light source, a deflector that deflects light emitted from the light source, an image formation optical system that focuses the light deflected by the deflector, the image formation optical system including the plastic optical element mentioned above arranged facing the deflector, and a light entering system that enters the light focused by the image formation optical system into a target.

First Embodiment and Second Embodiment
Plastic Optical Element, and Optical Scanning Device Embodiments of the present invention about the plastic scanning lens as the plastic optical element forming an optical scanning device of a color laser beam printer are described below in detail with reference to accompanying drawings.

Figure 2:
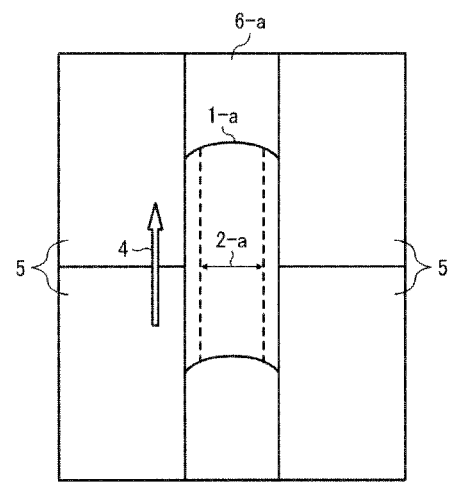
FIG. 2 is a diagram illustrating a cross section of a typical plastic scanning fθ lens with a lens phase of a concavo-convex form and a die.

FIG. 1 is a perspective diagram illustrating a typical plastic scanning fθ lens 1-*a* and FIG. 2 is a cross section illustrating the plastic scanning lens 1-*a* arranged in a die having a typical mirror-finish insert 6-*a*, and a bush 5. The plastic scanning lens 1-*a* has a lens phase 3 including a light effective portion 2-*a*.

In addition, a perpendicular direction from bottom to top in FIG. 2 indicated by an arrow 4 is the direction of light passing direction.

Figure 3:
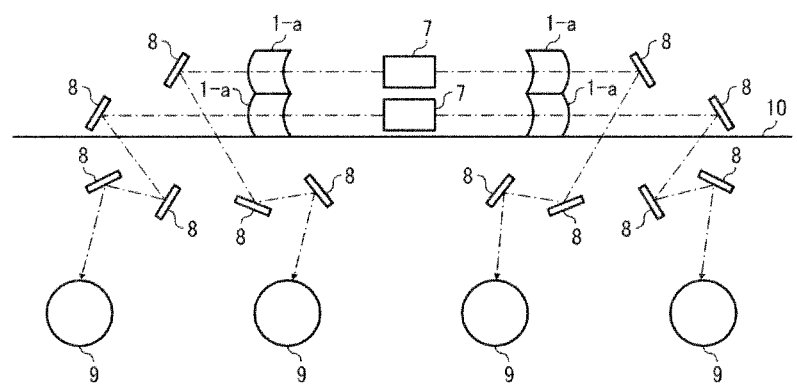
FIG. 3 is a diagram illustrating a cross section of typically laminated plastic scanning fθ lens with a lens phase of a concavo-convex form, and an optical scanning device.

FIG. 3 is a cross section illustrating an optical scanning device having the laminated scanning fθ lens 1-*a*.

In one embodiment of the optical scanning device as illustrated in FIGS. 4, 5, 6 and 7, the optical scanning device includes an image forming system including a light source (not shown), a deflector 7, a light entering system 8, i.e., reflection mirror, and a plastic scanning lens 1-*b* arranged facing the deflector 7. The plastic scanning lens 1-*b* has multiple light effective portions 2-*a* and 2-*b* which are connected to each other by a border arc, i.e., link portion having a curvature radius R of 2 mm or greater. Furthermore, the tangent of the light effective portion at the connection point of the light effective portion and the border arc matches the tangent of the border arc, i.e., link portion, thereat.

In this embodiment, four photoreceptors 9 corresponding to each color of yellow, magenta, cyan and black are placed as the target where the light enters from the light entering system. In addition, the scanning lens 1-*b*, the deflector 7, and some of the reflection mirror 8 are placed on a housing 10.

The light effective portion represents an area through which beams of light pass in the optical designing, and corresponds to the quality guarantee area of the plastic optical element in terms of optical layout.

Figure 4:
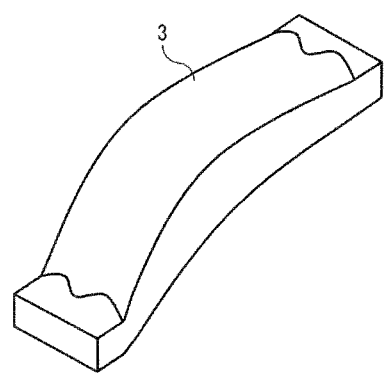
FIG. 4 is a perspective view illustrating an integrated plastic scanning fθ lens with a lens phase of a concavo-convex form in an embodiment of the plastic optical element related to the present invention.

Embodiments, i.e., First embodiment and Second embodiment, using an integrated plastic scanning fθ lens illustrated in FIG. 4 are described below as specific examples.

Figure 7:
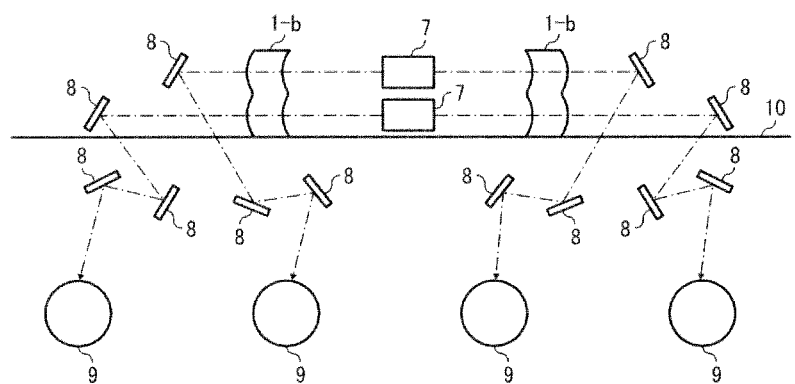
FIG. 7 is a cross section illustrating an integrated plastic scanning fθ lens with a lens phase of a concavo-convex form in an embodiment of the plastic optical element related to the present invention, and an optical scanning device having the plastic scanning lens.

In addition, FIG. 7 is a cross section illustrating an optical scanning device having the scanning lens 1-*b*. Descriptions about the same portions as those in the typical optical scanning device are omitted. Furthermore, with regard to the material forming the plastic scanning lens, there is no specific limit thereto and any known typically used plastic can be used.

Figure 5:
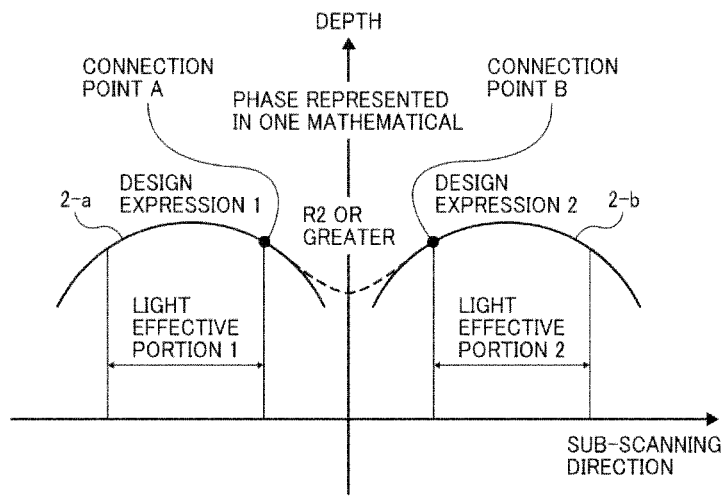
FIG. 5 is a schematic diagram illustrating a continuous phase having a lens phase of a concave form including multiple light effective portions.
Figure 6:
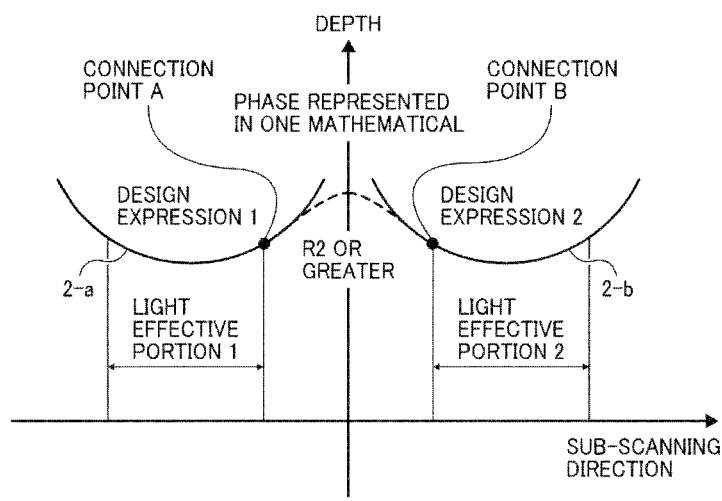
FIG. 6 is a schematic diagram illustrating a continuous phase having a lens phase of concave form including multiple light effective portions.

As illustrated in FIGS. 5 and 6, these embodiments have light effective portions 2-*a* and 2-*b* and the light effective portions 2-*a* and 2-*b* are connected, i.e., linked, with an arc, i.e., link portion, having a curvature radius R of 2 mm or greater. In addition, the tangent of the light effective portion 2-*a* or 2-*b* at the corresponding connection point A or B matches the tangent of the arc at the corresponding connection point A or B. That is, the tangent of the light effective portion 2-*a* at the connection point A and the tangent of the arc at the connection point A are the same and the tangent of the light effective portion 2-*b* at the connection point B and the tangent of the arc at the connection point B are the same.

Therefore, each of the connection points A and B are continuously connected in the sub-scanning direction.

In other words, on a plane vertical to the main scanning direction of the optical scanning device and parallel to the sub-scanning direction, the light effective portions 2-*a* and 2-*b* are connected in the sub-scanning direction via the connecting (link) portion. The connecting portion forms a border line, i.e., a dotted curve illustrated in FIG. 5 or 6, formed of an arc having a curvature radius R of 2 mm or greater. The border line contacts with the light effective portions 2-*a* and 2-*b* at its both ends and the tangent at either end of the border line matches the tangent of the corresponding light effective portions 2-*a* or 2-*b*.

In the first embodiment illustrated in FIG. 5, the lens planes forming the light effective portions 2-*a* and 2-*b* are convex and in the second embodiment illustrated in FIG. 6, the lens planes forming the light effective portions 2-*a* and 2-*b* are concavo.

In addition, the vertical axis in FIG. 5 or 6 represents the depth, i.e., thickness, direction of the plastic scanning lens, and matches the light passing direction when the plastic scanning lens is provided in the optical scanning device.

Die

FIG. 8 is a graph illustrating the relationship between the curvature radius R and the connection portion.

The embodiments are based on the experiment data showing that when the curvature radius is too small, for example, less than 2 mm, the edge tool or bit used in the cutting process contacts or interferes with points other than the processing contact point, resulting in the problem of damage to the die i.e., mirror-finish insert. In addition, it is impossible to change the form of the edge tool to avoid this problem taking into account the physical strength against the processing resistance.

Furthermore, the edge tool, i.e., jig or bit, typically used is regulated with regard to its size. It is difficult to manufacture a bit having a different size from the typical size, which also results in a cost increase.

Figure 8A:
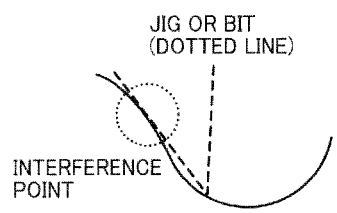
FIG. 8 is a diagram illustrating the interference of the edge tool and the mirror-finish inserts with regard to the curvature radius.
Figure 8B:
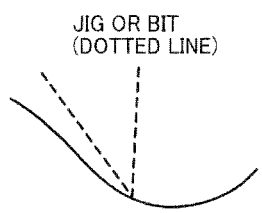

To avoid this cost increase, a typical tool is used but when the curvature radius is less than 2 mm the mirror-finish insert and the bit interfere (i.e., contact) with each other at two points as illustrated in FIG. 8A, resulting in damage to the mirror-finish insert. This interference does not occur for a structure illustrated in FIG. 8B.

Figure 9:
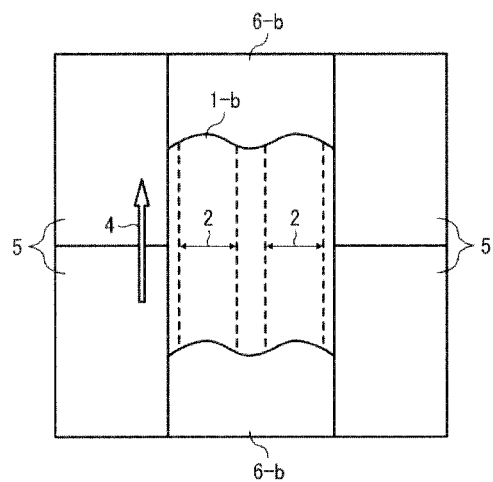
FIG. 9 is a cross section illustrating an integrated plastic scanning fθ lens with a lens phase of concavo-convex form, and a die in the first embodiment described later of the plastic optical element related to the present invention.
Figure 10:
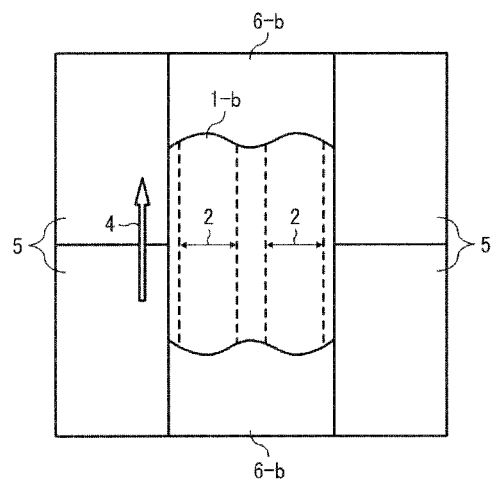
FIG. 10 is a cross section illustrating an integrated plastic scanning fθ lens with a lens phase of convexo-convex form, and a die in the second embodiment described later of the plastic optical element related to the present invention.

In the scanning fθ lens 1-*b*, the die for use in molding this lens is structured as illustrated in FIG. 9 or 10.

As in the case of the scanning fθ lens 1-*b*, the planes of the integrated mirror-finish insert 6-*b* that correspond to the light effective portions 2-*a* and 2-*b* are connected with an arc having a curvature radius R of 2 mm or greater and, at the connection points, the tangent of the light effective portion 2-*a* or 2-*b* at the side end of the connection point A or B matches the tangent of the arc at the side end of the connection point A or B.

FIG. 11 are schematic diagrams illustrating schematic appearances of the scanning fθ lens molded by this die and graphs illustrating the variability of the dimensional accuracy together with typical examples.

Beams of light that pass through top or bottom part, i.e., the light effective portion 1 or 2, of the scanning lens correspond to two colors, for example, yellow and magenta, for a color image forming apparatus.

Figure 11A:
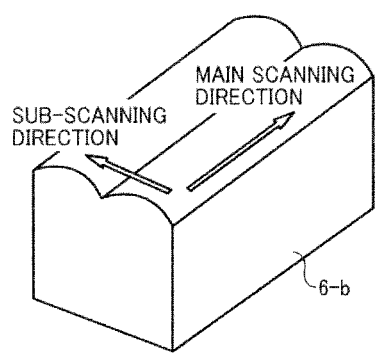
FIG. 11 is a perspective view illustrating an integrated mirror-finish insert for an fθ lens in an embodiment of the plastic optical element related to the present invention, and a graph illustrating the form accuracy.
Figure 11B:
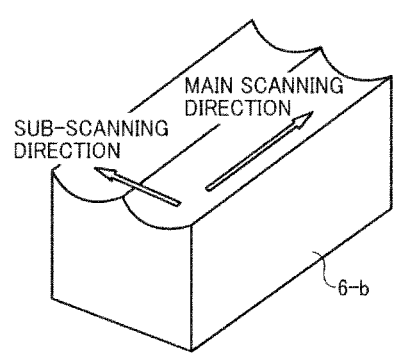
Figure 11C:
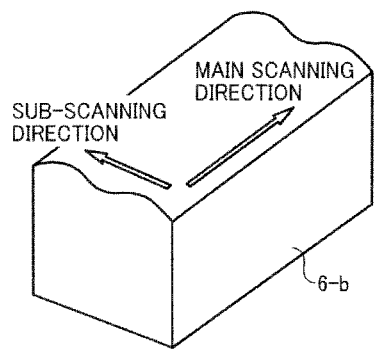
Figure 11D:
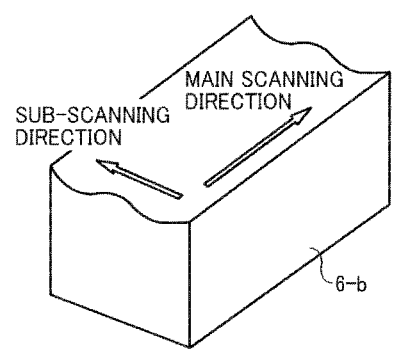
Figure 11E:
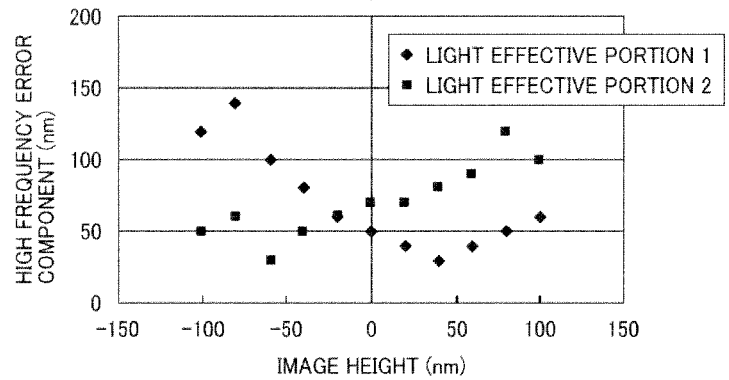
Figure 11F:
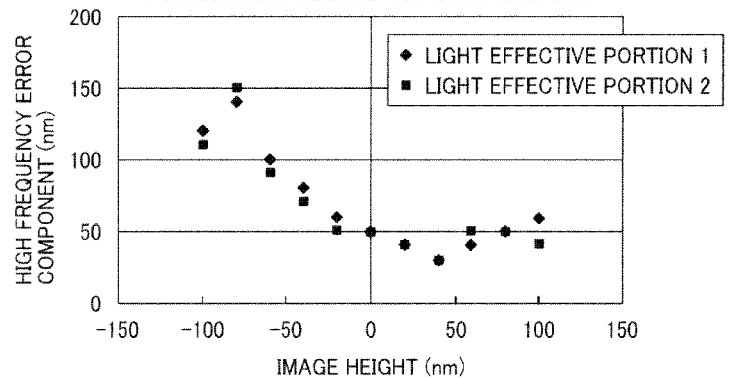

In this case, any lapse in the quality of the light effective portion 1 or 2 results in variability of the optical performance, e.g., beam diameter, thereby causing variability among colors, e.g., uneven density, resulting in an increase in level of defectiveness. Although this lapse can be compensated by adjusting the writing unit for each scanning lens, the cost increases due to this compensation. As seen in the comparison illustrated in FIGS. 11E and 11F, the lapse in the quality of the light effective portions 1 and 2 formed by continuous mirror-like finishing illustrated in FIG. 11F is less than the lapse in the quality of the light effective portions 1 and 2 formed by non-continuous mirror-like finishing illustrated in FIG. 11E.

In FIGS. 9 and 10, the embodiments preferably include the bush 5.

As described above, when the mirror-finish insert 6-b has a convex surface form, the lens can be subject to not only mirror-like finishing, but also continuous mirror-like finishing in the main scanning direction, and the sub-scanning direction. In addition, when the mirror-finish insert has a concave surface form, the lens can be subject to continuous mirror-like finishing in the main scanning direction, and the sub-scanning direction.

Since the continuous mirror-like finishing is possible in the main scanning direction and the sub-scanning direction, the error of the dimensional accuracy of each light effective portion, i.e., the variability of the curvature error component and the high frequency error component obtained after subtracting the curvature error at each image height, can be reduced. When a lens is subject to continuous mirror-like finishing treatment particularly in the sub-scanning direction, one of the main impacts in history, i.e., changes in the environment such as atmosphere temperature, during mirror-like finishing, is almost equal at each image height. Therefore, the variability of the high frequency error component at each image height and in the sub-scanning direction among the light effective portions 2-a and 2-b can be reduced.

As a result, the variability of the scanning position, i.e., relative positional shift in the sub-scanning direction decreases, resulting in reduction of occurrence of color shift, one of the major impacts for a color image forming apparatus.

In addition, when the form of the mirror-finish insert is concave, the figure around the border, i.e., folding point, in the sub-scanning direction is improved by employing the structure of the embodiments described above, which leads to improvement in the accuracy of the image forming element, i.e., plastic optical element 1-b.

At the same time, when the mirror-finish insert 6-b is used, the variability of the fixing accuracy is reduced by laminating the image formation elements. Consequently, the variability of the scanning position along the sub-scanning direction is reduced, which leads to improvement in a critical problem of color shift of each color for a color image forming apparatus.

In addition, integration of the scanning lens has merits of: (1) reducing trouble with regard to appearance at the border surface due to air engulfment occurring when two or more mirror-finish inserts are attached; (2) saving the cost by shortening the cycle time, i.e., cooling time, etc.

Third Embodiment and Fourth Embodiment

Other Embodiments (Third embodiment and Fourth embodiment) using an integrated plastic scanning fθ and long lens are described below.

As illustrated in FIGS. 5 and 6, these have light effective portions 2-a and 2-b in the sub-scanning direction, and the light effective portions 2-a and 2-b are connected by an arc having a curvature radius R of 2 mm or greater. In addition, the tangent of the end of the light effective portion 2-a or 2-b at the connection point A or B matches the tangent of the arc end at the connection point A or B, respectively.

Figure 12:
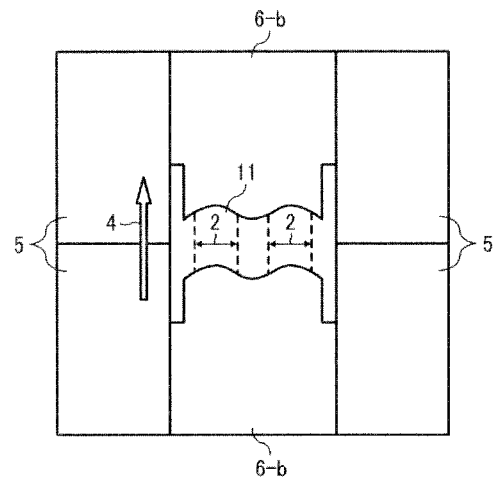
FIG. 12 is a cross-section illustrating an integrated plastic scanning long lens with a lens phase of concavo-convex form, and a die in the third embodiment described later of the plastic optical element related to the present invention.
Figure 13:
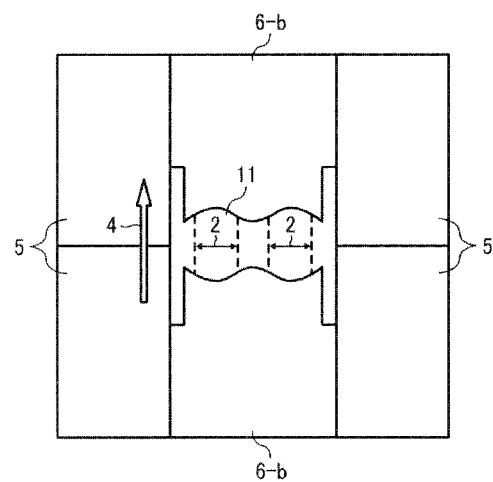
FIG. 13 is a cross-section illustrating an integrated plastic scanning long lens with a lens phase of convexo-convex form, and a die in the fourth embodiment described later of the plastic optical element related to the present invention.

In the scanning long lens, the die for use in molding this lens is structured as illustrated in FIG. 12 or 13. The reference numeral 11 represents a plastic scanning long lens.

Figure 14A:
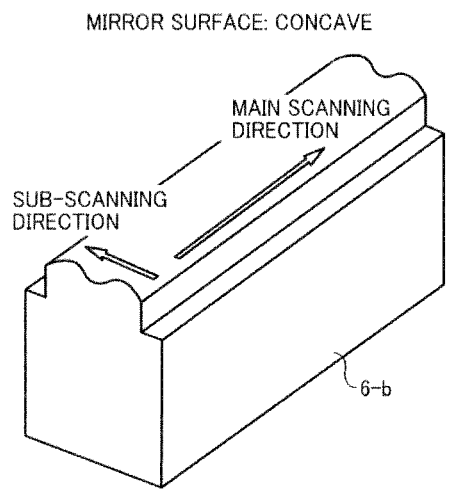
FIG. 14 is a perspective view illustrating an integrated mirror-finish insert for a long lens in an embodiment of the plastic optical element related to the present invention.
Figure 14B:
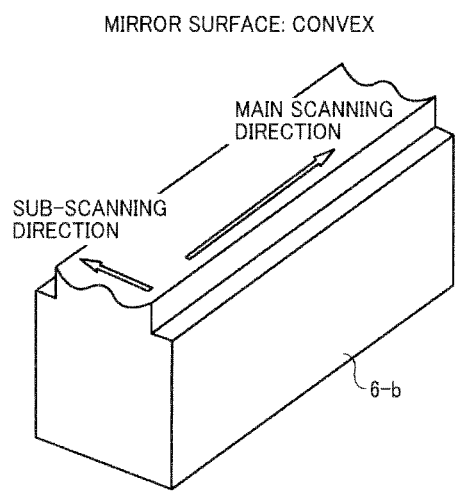

As in the case of the scanning lens (long lens) described above, the planes of the integrated mirror-finish insert 6-b that correspond to the light effective portions 2-a and 2-b are connected with an arc having a curvature radius R of 2 (mm) or greater and the tangent of the end of the light effective portion 2-a or 2-b at the connection point A or B matches the tangent of the arc end at the connection point A or B, respectively (refer to FIG. 14).

Figure 15A:
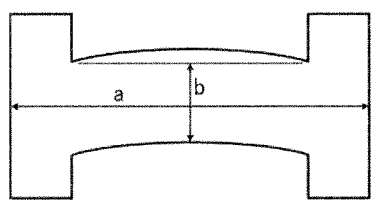
FIG. 15 is a diagram illustrating the aspect ratio of lens products.
Figure 15B:
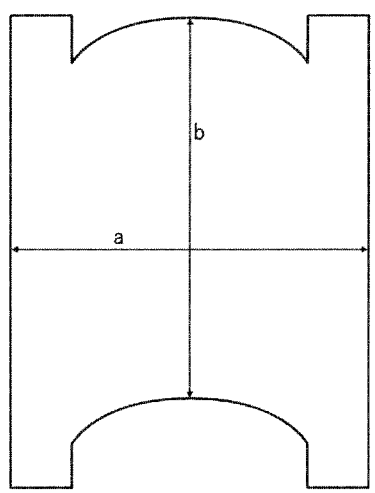

The temperature in the molded product in the die is highest in the center portion immediately after molding, and the conveyance speed of the heat-transfer velocity is constant. Therefore, the temperature of the phase that has a shorter length between the center to the outer surface (i.e., cavity surface) forming the product in the die descends faster than the other phase and thus the heat contraction proceeds unevenly. In the case of FIGS. 12, and 13 in which the aspect ratio of b/a is less than 1 as illustrated in FIG. 15A, the direction indicated by b cools faster than the direction indicated by a and vice versa in the case of the first or the second embodiment illustrated in FIGS. 9, and 10 in which the aspect ratio of b/a is greater than 1 as illustrated in FIG. 15B.

When the aspect ratio is less than 1, the actual functioning lens phase cools down faster so that, when melted resin is filled in a die followed by cooling down, part of the outer form is detached from the surface of the die by heat contraction, resulting in formation of concave portions in the surface of the obtained product.

These embodiments have the same effect to both case irrespective of the aspect ratio of b/a and avoid this phenomenon.

There is no specific limit to the long lens except for the points described above and any known typically used structure can be used.

As described above, the optical element is manufactured by an integrated mirror-finish inserts, which makes possible continuous processing without repeating the initial setup. Since the initial setup is repeated, the degree of factors that affects the processing accuracy such as (1) environmental change (2) assembly error of the mirror-finish insert is reduced. As a result, the variability of the light effective portions 1 and 2 decreases.

Beams of light that pass through top or bottom part, i.e., the light effective portion 1 or 2, of the scanning lens correspond to two colors (ex., yellow and magenta) for a color image forming apparatus.

Any lapse in the quality of the light effective portion 1 or 2 results in variability of the optical performance, e.g., beam diameter, thereby causing variability among colors, e.g., uneven density, resulting in an increase in level of defectiveness. Although this lapse can be compensated by adjusting the writing unit for each scanning lens, the cost increases due to this compensation. Without this adjustment, the variability among colors occurs, which leads to an increase in level of defectiveness.

The embodiments described above have only one connection (link) portion and two light effective portions but may have 3 or more light effective portions with a corresponding numbers of link portions.

Image Forming Apparatus

An embodiment of the image forming apparatus includes the optical scanning device described above.

As the image forming apparatus, there is no specific limit thereto and any known apparatus including an optical scanning system such as a digital photocopier employing a laser system, a laser printer and a facsimile machine can be used.

One embodiment of the image forming apparatus is a printer having a paper feeder cassette from which a recording medium is transferred with a transfer belt, an image bearing member that bears a latent image, a charging device (charger) that charges the image bearing member, an optical scanning unit that scans the surface of the image bearing member to form the latent image bearing member, a development device that develops the latent image with toner to obtain a toner image, a transfer device including a transfer charger that transfers the toner image to the recording medium directly or via an intermediate transfer body, a cleaning device that cleans the surface of the image bearing member, a fixing device that fixes the toner image on the recording medium, etc. In the case of a color printer, such a color printer may have a tandem system in which four image bearing members for each color of Y (yellow), M (magenta), C (cyan) and K (black) are provided arranged with the same interval therebetween while having the same diameter. In addition, around each image bearing member, there are provided the same processing members of electrophotography which are the charger, the optical scanning unit, the development device, the transfer charger, the cleaning device, etc. Around the transfer belt, registration rollers and a belt charger are provided on the upstream side of the image bearing members relative to the transfer direction of the recording medium. On the downstream side are provided a belt separation charger, a discharging charger, and a cleaning device.

In such an image forming apparatus, the latent electrostatic image is formed on the image bearing member by optical scanning unit and developed with toner of each color at each image bearing member to obtain a toner image. Thereafter, the toner image is sequentially transferred to the recording medium and overlapped there on to form a (full) color image followed by fixing at the fixing device and discharging by discharging rollers.

Therefore, a highly accurate optical scanning device is provided that has improved optical performance without a cost increase accompanied by changing a processing method or a design of a die of the plastic optical element, i.e., scanning lens, and an optical scanning device and an image forming apparatus using the optical scanning device.

This document claims priority and contains subject matter related to Japanese Patent Application No. 2009-206684, filed on Sep. 08, 2009, the entire contents of which are hereby incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A plastic optical element for use in an optical scanning device, comprising:
   light effective portions that focus light in a light passing direction; and
   at least one link portion that connects the light effective portions in a sub-scanning direction,
   the link portion comprising a border arc having a curvature radius R of 2 mm or greater and contacting the light effective portions such that a tangent of the light effective portion at a connection point of the light effective portion and the border arc matches a tangent of the border arc at the connection point,
   wherein for each light effective portion of the light effective portions connected by the link portion, an aspect ratio (b/a) of the light effective portion is less than 1, where b is a dimension of the light effective portion in the light passing direction, and a is a dimension of the light effective portion in the sub-scanning direction.

2. An optical scanning device comprising:
   a light source;
   a deflector that deflects light emitted from the light source;
   an image formation optical system that focuses the light deflected by the deflector, the image formation optical system comprising the plastic optical element of claim 1 arranged facing the deflector; and
   a light entering system that enters the light focused by the image formation optical system into a target.

3. An image forming apparatus comprising:
   an image bearing member;
   the optical scanning device of claim 2 that forms a latent electrostatic image on the image bearing member;
   a development device that develops the latent electrostatic image with toner to form a toner image on the image hearing member; and
   a transfer device that transfers the toner image onto a recording medium.

* * * * *